United States Patent
Cordery et al.

(10) Patent No.: US 6,814,291 B1
(45) Date of Patent: Nov. 9, 2004

(54) ROBUST BARCODE READER

(75) Inventors: Robert A. Cordery, Danbury, CT (US);
Wallace Kirschner, Farmington, CT (US); Bahram Javidi, Storrs, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/736,036

(22) Filed: Dec. 15, 2003

(51) Int. Cl.[7] ............................................... G06K 7/10
(52) U.S. Cl. ........................ 235/462.25; 235/462.09; 235/462.1; 235/462.01; 235/462.08; 235/462.32; 235/494
(58) Field of Search ...................... 235/462.25, 462.09, 235/462.1, 462.01, 462.08, 462.32, 494

(56) References Cited

U.S. PATENT DOCUMENTS

| | | | | |
|---|---|---|---|---|
| 5,726,435 | A | * | 3/1998 | Hara et al. .................... 235/494 |
| 5,866,888 | A | * | 2/1999 | Bravman et al. ............. 235/375 |
| 5,880,453 | A | * | 3/1999 | Wang et al. ............ 235/462.01 |
| 5,889,270 | A | * | 3/1999 | van Haagen et al. ... 235/462.15 |
| 6,612,497 | B1 | * | 9/2003 | Iida et al. .............. 235/462.25 |
| 2002/0088865 | A1 | * | 7/2002 | He et al. ..................... 235/494 |
| 2003/0089779 | A1 | * | 5/2003 | Giordano et al. ............ 235/454 |
| 2003/0116628 | A1 | * | 6/2003 | Nakazawa et al. ........ 235/462.1 |
| 2004/0026511 | A1 | * | 2/2004 | Cheung et al. ........... 235/462.1 |

* cited by examiner

*Primary Examiner*—Jared J. Fureman
*Assistant Examiner*—Allyson N Trail
(74) *Attorney, Agent, or Firm*—Ronald Reichman; Angelo N. Chaclas

(57) ABSTRACT

A method and system for reading a two-dimensional barcode symbol on a mailpiece. The barcode symbol may be distorted during the printing process or the image acquiring process, rendering it difficult to recognize by a conventional template matching method. Typically, a two-dimensional barcode symbol is composed on a two-dimensional array of visually contrasting blocks. Any group of four adjacent blocks sharing a common corner may form an identifiable pattern. These patterns can be used as internal landmarks. When the barcode symbol is distorted, the distances between the internal landmarks change accordingly. Using an Lp-norm algorithm to measure the distances in the transform domain, distortion can thus be determined and the global geometry of the barcode symbol restored based on the distance measurements.

10 Claims, 7 Drawing Sheets

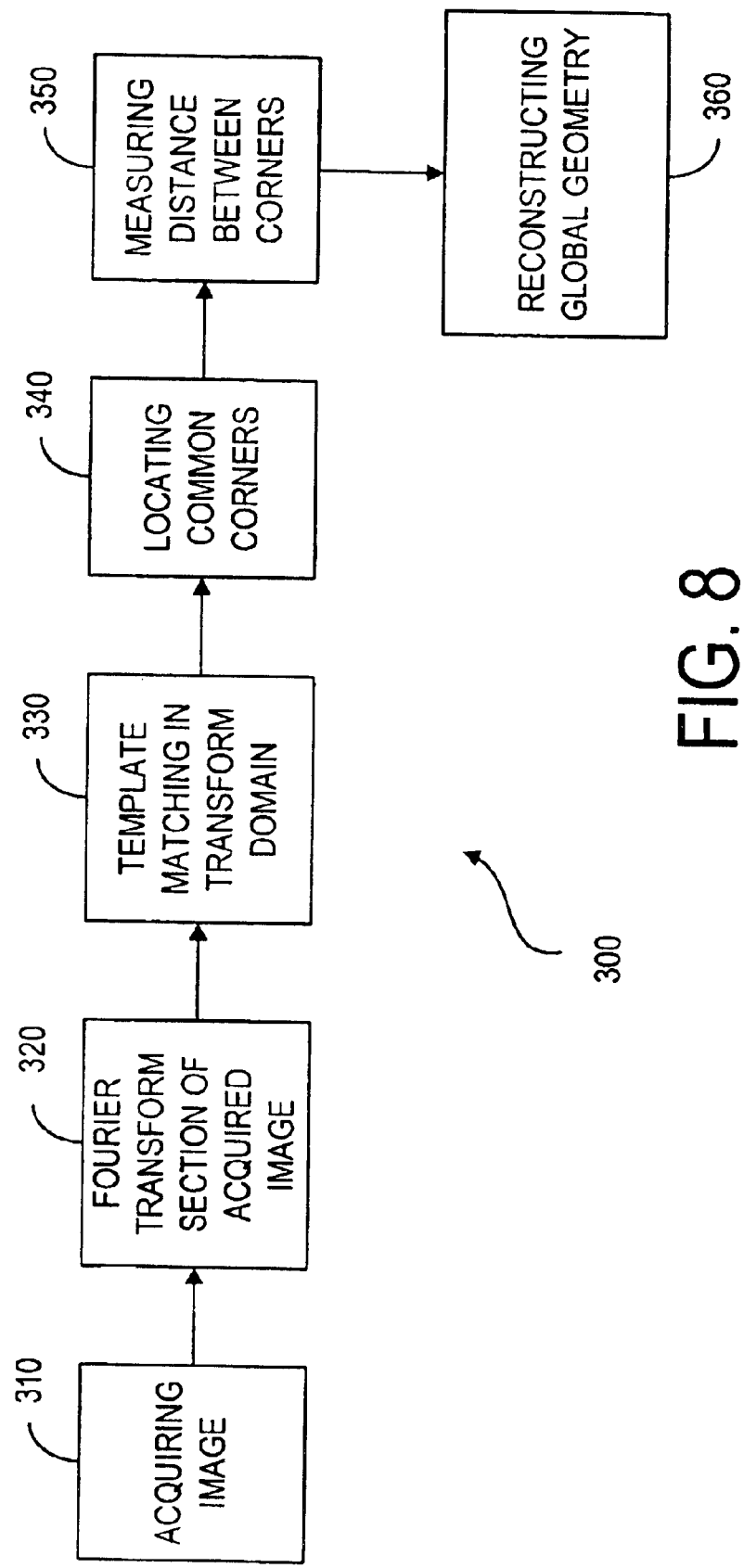

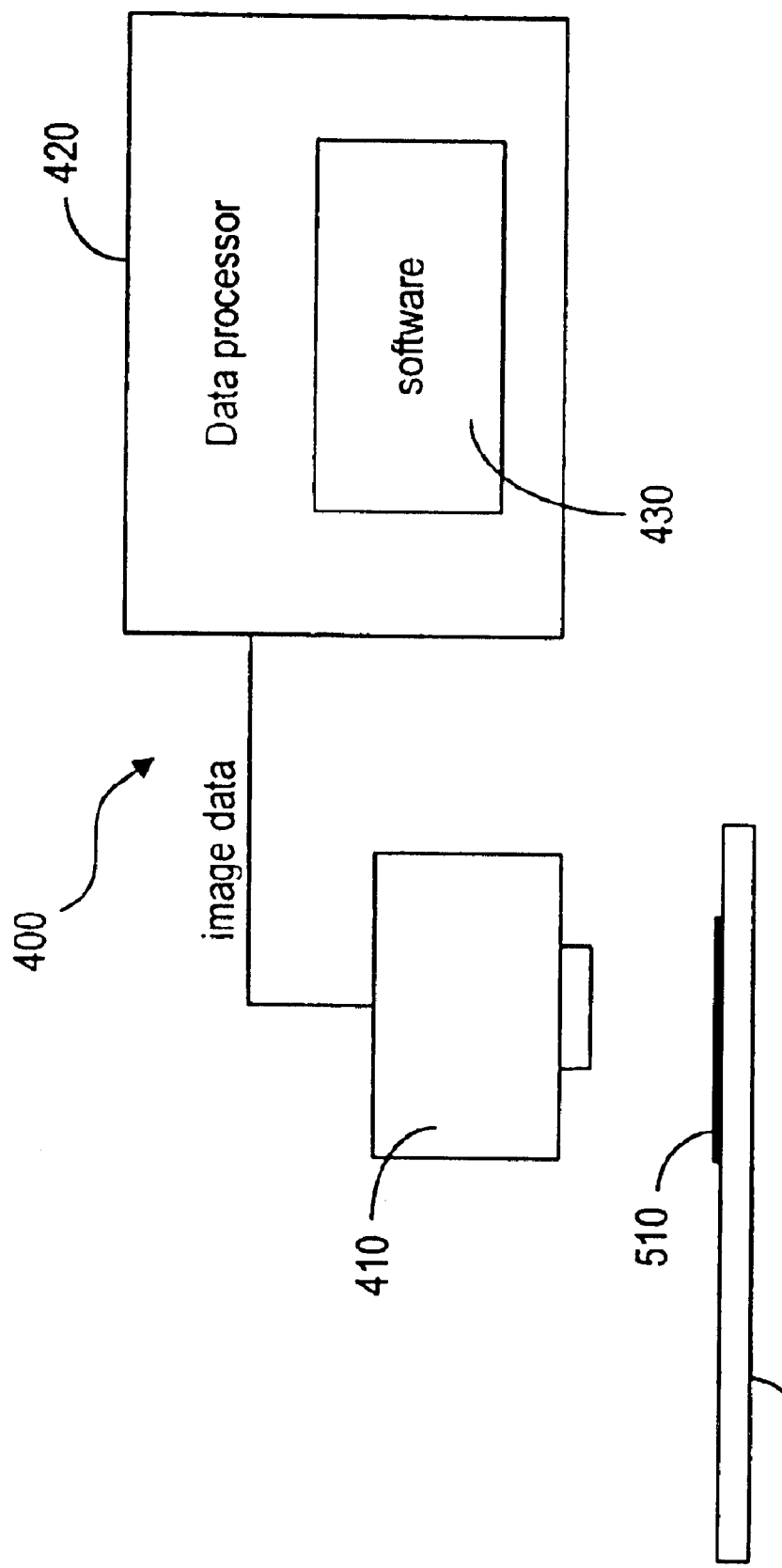

ROBUST BARCODE READER

FIELD OF THE INVENTION

The present invention relates generally to a barcode reader and, in particular, to the reading of a two-dimensional barcode symbol, which is distorted.

BACKGROUND OF THE INVENTION

A one-dimensional barcode symbol, like that used as a Universal Product Code (UPC), uses the width of the bars to represent a number. In that respect, a reader for one-dimensional barcodes relies on the location of the edge of a bar to determine the numeral represented by a plurality of bars. A two-dimensional barcode symbol, such as PDF417, is a stack of one-dimensional barcodes. Such a barcode symbol also uses the location of edges to specify a number. Thus, prior art readers that are used for reading a PDF417 barcode rely on internal coding of locations of the barcode symbol. The locations in a barcode symbol are relative to a certain reference point, and they may vary if the barcode symbol is distorted. Thus, whether the reading of a barcode symbol is reliable may depend on the global geometry of the symbol.

In mailing applications, a barcode is typically printed on the surface of a mailpiece at high speeds. If the mailpiece surface is curved, the barcode becomes distorted. The distortion on a one-dimensional barcode symbol may not result in a reading error because the barcode is composed of long lines, and it is possible to read the location of lines at different parts of the lines so as to correct the reading errors due to the distortion. In a two-dimensional barcode symbol, the "bars" are short, often square, blocks. Most two-dimensional barcodes use a part of the image known as a target to locate the blocks. The distortion may significantly move the location of the blocks such that the location of one block may be displaced relative to other blocks in the barcode, and especially relative to the target. Under that situation, an existing barcode reader may not be able to read the barcode symbol correctly.

Thus, it is advantageous and desirable to provide a method of reading a two-dimensional barcode symbol which is susceptible to distortion.

SUMMARY OF THE INVENTION

It is a primary object of the present invention to reconstruct the global geometry of a two-dimensional barcode symbol on a mailpiece or the like. Typically, the two-dimensional barcode symbol is composed of a plurality of contrasting polygons. The arrangement of the polygons results in a plurality of common corners, each of which is defined by a group of contrasting polygons located adjacent to each other. The barcode symbol may be distorted by the printing or imaging process. To achieve the above objective, the present invention uses some groups of contrasting polygons as internal landmarks, and then uses a plurality of templates to locate the internal landmarks to determine the local distortion.

Preferably, the method of reconstructing the global geometry of a two-dimensional barcode symbol includes the following steps: receiving image data indicative of at least a part of the two-dimensional barcode symbol; template matching the received image in order to locate the common corners; measuring the distances between the common corners; determining the distortion from the measured distances; and correcting for the distortion in the barcode symbol in order to reconstruct the global geometry of the barcode symbol.

The present invention uses an LP-norm algorithm to carry out the template matching process in the transform domain.

The present invention will become apparent upon reading the description taken in conjunction with FIGS. 1 to 9.

BRIEF DESCRIPTION OF THE DRAWINGS

FIG. 8 is a block diagram showing the process of reading a barcode symbol, according to the present invention.

FIG. 9 is a block diagram showing a system for reading a two-dimensional barcode, according to the present invention.

DETAILED DESCRIPTION OF THE INVENTION

Figure 1:
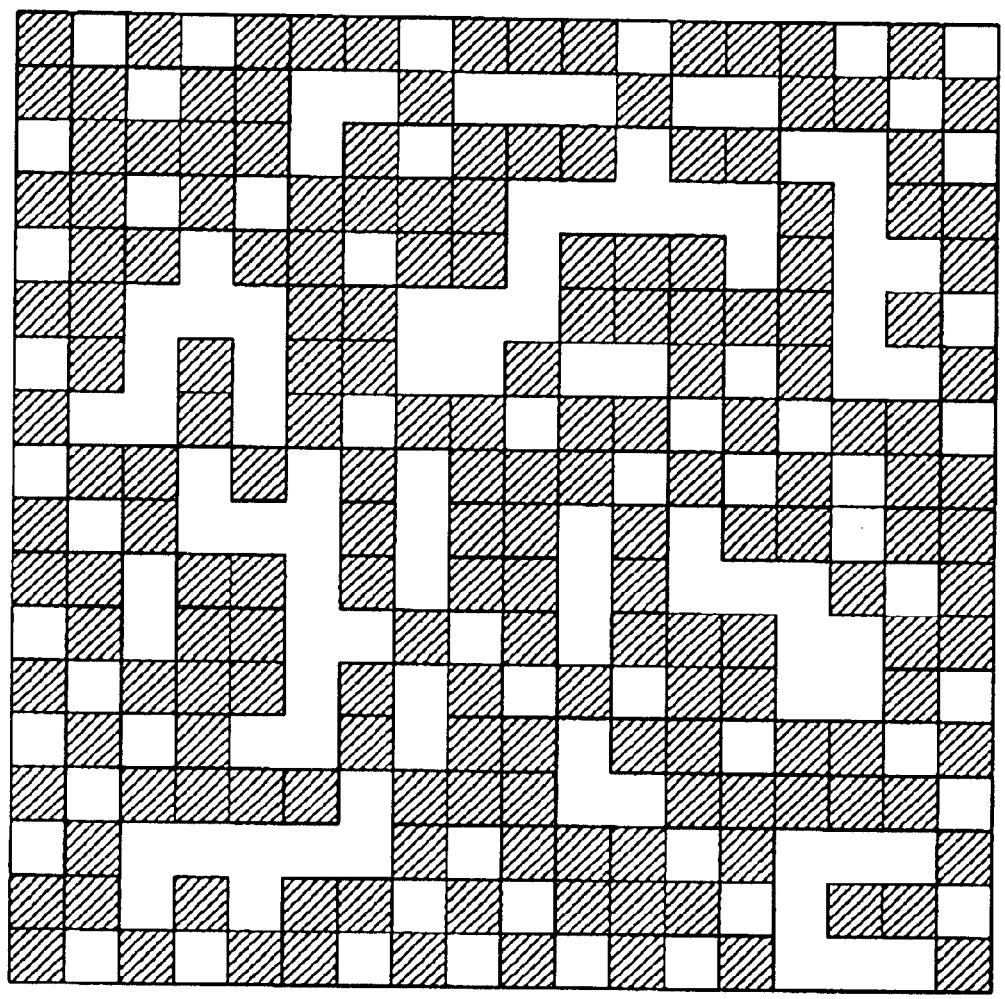
FIG. 1 is a schematic representation showing a two-dimensional barcode symbol.
Figure 2:
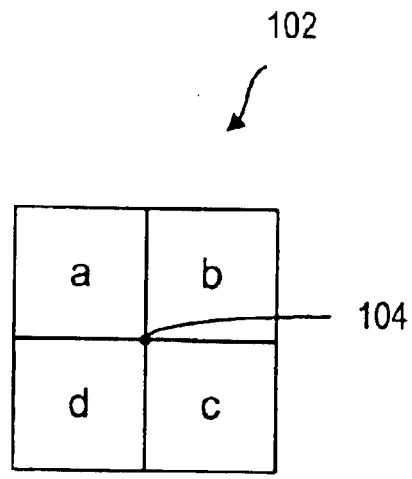
FIG. 2 is a schematic representation showing a 2×2 module within a two-dimensional barcode symbol.
Figure 3:
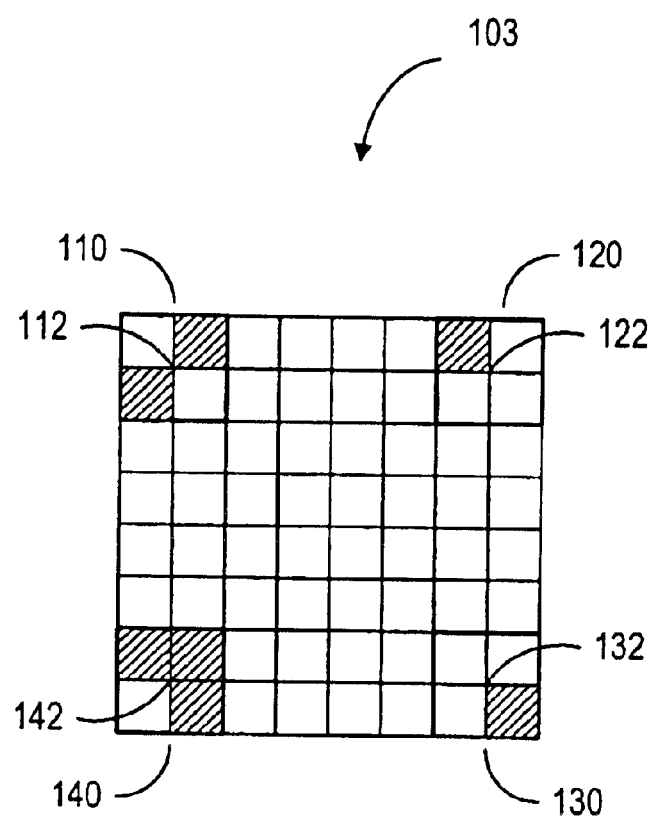
FIG. 3 is a schematic representation showing a plurality of modules being used as internal landmarks within a two-dimensional barcode symbol.

A two-dimensional barcode symbol, as shown in FIG. 1, is a block pattern composed of contrasting blocks or polygons of at least two different characteristics. As shown, the polygons are black and white rectangles or squares. Unlike a PDF417 barcode symbol where the "blocks" can have different widths as in a UPC symbol, the polygons in the two-dimensional barcode symbol, as shown in FIG. 1, are substantially the same size. In this exemplary barcode symbol, the polygons are rectangles, and four polygons form a 2×2 module or unit having a common corner shared by all four polygons. If the polygons are triangles, then six polygons form a module having a common corner shared by all six polygons. Likewise, if the polygons are hexagons, three hexagons form a module having a common corner shared by all three hexagons. As shown in FIG. 2, the module 102 is formed by polygons a, b, c and d sharing a common corner 104. In a block pattern as shown in FIG. 1, the common corners form a rectangular grid or lattice. If the block pattern is distorted, the grid will no longer be rectangular. If the distortion is substantial, the barcode symbol may not be recognized by a prior-art barcode reader. Thus, it is advantageous and desirable to provide a method which is less susceptible to distortion for reading a two-dimensional barcode symbol.

In a block pattern of contrasting polygons of two colors (black and white, for example), in order that the common corner of a 2×2 module is unambiguously detectable, the module must have both colors, and one of the colors must appear in one diagonal pair of polygons. For example, if polygons a and c are black, then at least b or d must be white. However, if polygons a and b are black and polygons c and d are white, their shared corner cannot be unambiguously detected. Among the modules formed by 2×2 polygons of two colors, there are ten modules with a detectable shared corner that have different color arrangements. These modules can be used as internal landmarks within a block pattern for distortion detection purposes.

Figure 4A:
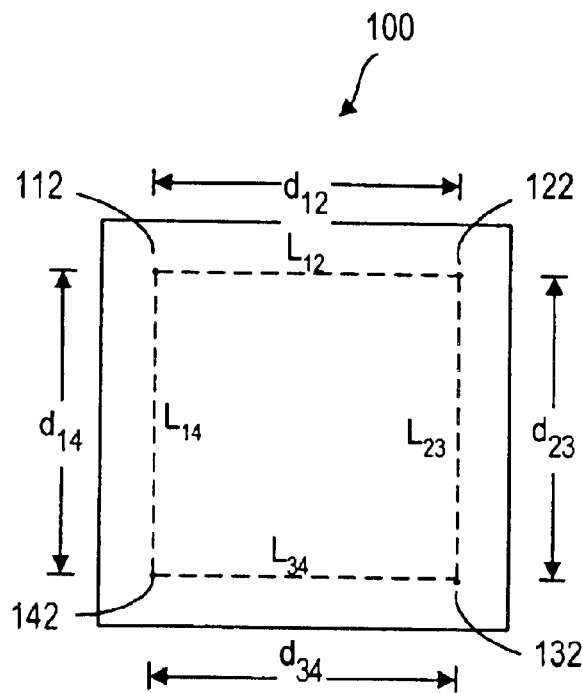
FIG. 4A is a schematic representation showing the locations of internal landmarks in a non-distorted two-dimensional barcode symbol.

According to the present invention, a plurality of 2×2 modules are used as landmarks, and these modules can be of the same color arrangement or of different color arrangements. For illustration purposes, four modules 110, 120, 130 and 140 are used as landmarks in a block pattern 103. The common corners in this case are 112, 122, 132 and 142, and they can be considered as the four corners of a rectangle bound by four sides $L_{12}$, $L_{23}$, $L_{34}$, $L_{14}$, as shown in FIG. 4a, which depicts an "undistorted" barcode symbol. The distances between two corners are denoted by $d_{12}$, $d_{23}$, $d_{34}$ and $d_{14}$. In this illustration, the distances $d_{12}$, $d_{23}$, $d_{34}$ and $d_{14}$ are substantially the same if the blocks are square. Furthermore, the side $L_{12}$ joining the common corner 112 and common corner 122 is parallel to the side $L_{34}$ joining the common corner 130 and common corner 140. Similarly, side $L_{14}$ is parallel to side $L_{23}$. Also, side $L_{14}$ is perpendicular to sides $L_{12}$ and $L_{34}$, and side $L_{23}$ is perpendicular to sides $L_{12}$ an $L_{34}$. The relationship among the common corners of the internal landmarks represents a characteristic of the global geometry of a two-dimensional barcode symbol. In the example shown in FIG. 4a, the characteristic of the global geometry is that the lines joining the common corners of the internal landmarks form a square. When the two-dimensional barcode symbol is distorted, as shown in FIG. 4b, the characteristic of the global geometry changes.

Figure 4B:
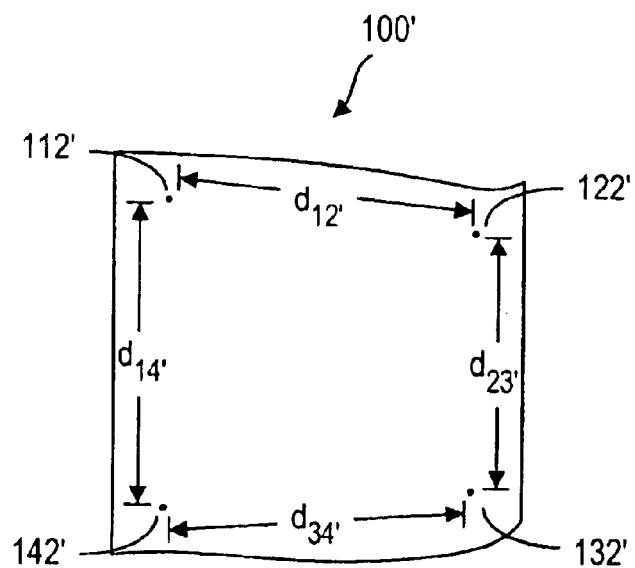
FIG. 4B is a schematic representation showing the locations of the corresponding internal landmarks in a distorted two-dimensional barcode symbol.

As shown in FIG. 4b, the relative locations of the common corners 112', 122', 132' and 134' are different than those of the common corners 112, 122, 132 and 142. Because of the distortion, $d_{14}'$ is not equal to $d_{23}'$, $L_{12}'$ is not parallel to $L_{34}'$, and the polygon formed by the lines joining all four common corners 112', 122', 132' and 142' is no longer a square. Thus, by determining the distances between the internal landmarks, it is possible to determine the changes in the global geometry of the two-dimensional barcode symbol. It is also possible to reconstruct the global geometry once the distortion is known.

In order to locate these internal landmarks, one or more templates are used to find a match between the landmark modules and the templates. This template matching process can be carried out using a spatial correlation scheme. However, it is also possible to carry out the template matching process in a transform domain.

Figure 5A:
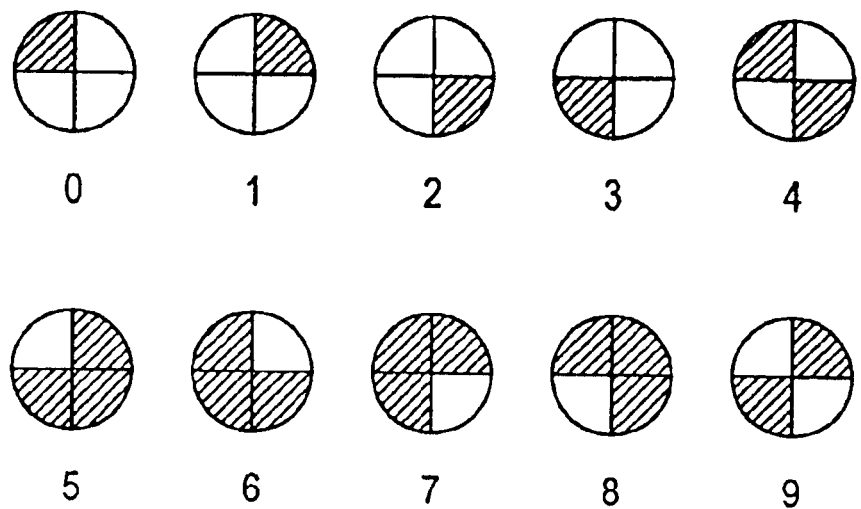
FIG. 5A shows a group of templates that can be used to unambiguously locate an internal landmark in a two-dimensional symbol.

As mentioned above, when a 2×2 module is formed by polygons of two colors and at least a pair of diagonal polygons are of the same color, then the common corner of that module is detectable. It is possible to use a 2×2 template to locate the common corner of a 2×2 module by template matching. FIG. 5a shows a group of templates that can be used to unambiguously locate an internal landmark in a two-dimensional symbol. Each template is formed by four sections sharing a common corner, and at least one section has a different color from the color of the other sections. Any one of this group of templates has at least one pair of diagonal blocks of the same color. For example, in the template "0", the sections at the first and third quadrants are of the same color. Likewise, in the templates "1" to "9", at least one such pair of diagonal blocks is present.

Figure 5B:
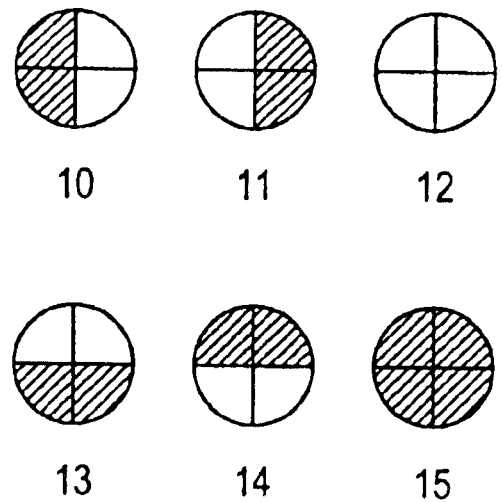
FIG. 5B shows a group of templates that cannot be used unambiguously to locate an internal landmark in a two-dimensional symbol.
Figure 6:
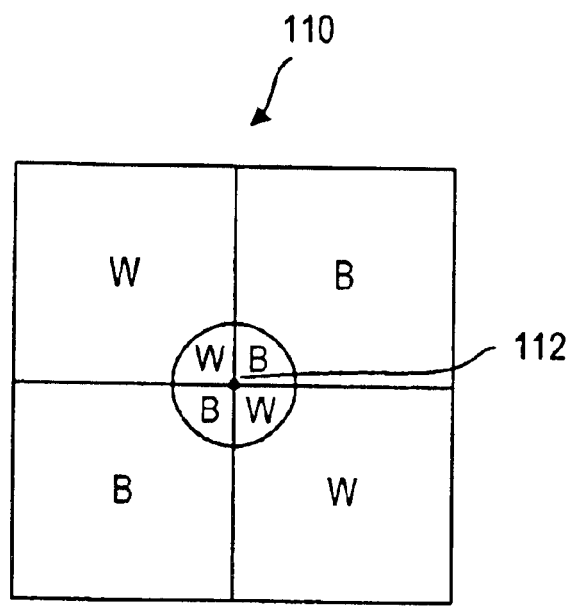
FIG. 6 is a schematic representation showing the size of a template as compared to a module.

FIG. 5b shows a group of templates that cannot be used to unambiguously locate an internal landmark in a two-dimensional barcode symbol. As shown, in template "12" or "15", all the sections are of the same color and, therefore, the common corners of the sections is not visible. In templates "10", "11", "13" and "14", none of the diagonal sections are of the same color and, therefore, these templates are not useful for locating the common corner of a module. It should be noted that the "blocks" on the barcode symbol, as depicted in FIG. 1 are polygons, whereas the "sections" on the templates as depicted in FIGS. 5a and 5b are sections of a circular pie. This suggests that the blocks on the barcode symbol and the sections on the templates can be different in shapes. However, the blocks on the barcode symbol and the sections on the templates can be of a similar shape. In the preferred embodiment of the present invention, the blocks on the barcode symbol are rectangular or square. Furthermore, when a template is used to locate the common corner of a module by template matching, as shown in FIG. 6, it is preferred that the module is much larger than the template.

In order to locate an internal landmark, it is possible to acquire an image of at least a portion of the two-dimensional barcode symbol by an electronic camera or scanning device, and then use one or more templates to find a match in the acquired image. Preferably, template matching is carried out on small portions of the acquired image, as shown in FIG. 6. Using a spatial correlation technique, it is possible to find the location of the common corner 112 of the module 110. Here, the module 110 consists of two black blocks (B) and two white blocks (W). In terms of number of pixels in a digital image, the module is much larger than the template (template "9"). Thus, it is preferable to use a high-resolution imager or scanner to acquire the two-dimensional barcode symbol so that the location of the internal landmarks can be more accurately located.

Figure 7:
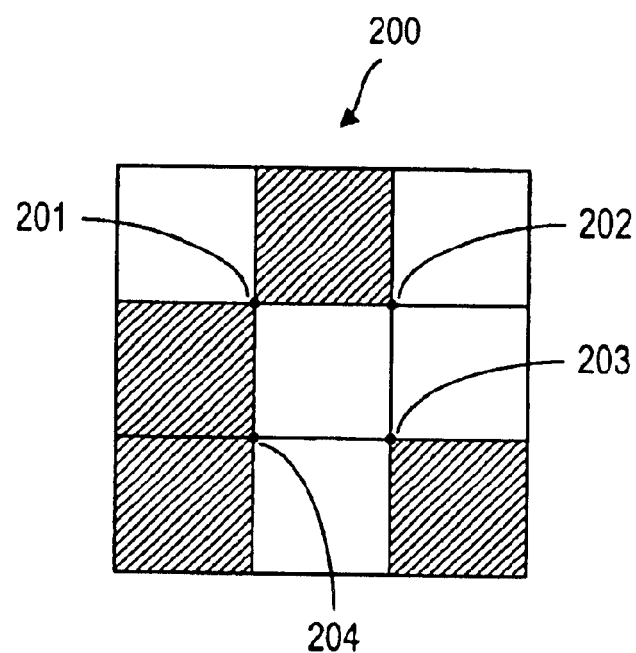
FIG. 7 is a schematic representation showing an acquired image portion containing a number of common corners.

It is preferable, however, to carry out the matching operation in a transform domain. For example, if the acquired portion of the two-dimensional barcode symbol contains 3×3 polygons, as shown in FIG. 7, there are four possible 2×2 modules. The common corners of these four modules are denoted by reference numerals 201, 202, 203 and 204. If template "9" is used to find a match in the image portion 200, then the 2×2 module having the common corner 201 can be found. Advantageously, the matching operation can be more efficiently carried out in a transform domain, because it is shift-invariant. For example, it is possible to perform a 2D Fourier transform of the image portion 200 into the frequency domain, and then use the 2D Fourier transform of the template "9" to detect the presence of the common corner 201, instead of determining the location of that corner. It is also preferable to use a number of templates ("0"–"9") in the frequency domain to carry out the matching operation in parallel so that the existence of certain modules can be detected simultaneously.

The method of reading a two-dimensional barcode symbol is summarized in the block diagram 300, as shown in FIG. 8. As shown in block 310, the image of at least a part of the two-dimensional barcode symbol is acquired, preferably using an electronic device such as a digital camera or an optical scanner. A section of the acquired image is transformed by 2D Fourier Transform into a frequency domain, as shown in block 320. At block 330, a plurality of filters, each of which is a template in the frequency domain, are used to find a match in the transformed image section. At this stage, the size of the templates should be selected to match reasonably with the module size. Preferably, a number of image sections in the transform domain are processed in a parallel manner for template matching. If the landmarks are distributed in the two-dimensional barcode symbol at fixed locations, it is possible to carry out template matching only in the transform domain of the image sections containing the landmarks. Once a matching a found, exact location of the landmark can be determined by spatial correlation at block 340. Subsequently, as shown at block 350, the distance d between two landmarks and the side L joining them can be obtained. Based on these measurements, the distortion of the barcode pattern can be determined and the global geometry of the two-dimensional barcode symbol can be reconstructed at block 360.

Preferably, the template matching using the templates in the transform domain to find a match in the transformed image sections is carried out in accordance with an Lp-norm algorithm as described below.

In the following, we will describe the Lp-norm algorithm in a one-dimensional case. The extension from one-dimension to two-dimension is straightforward and is known in the art.

Let s(j) denote an acquired image portion in which a landmark matching a template t(j) is to be detected, then the error in detection is given by $$E_p = (\Sigma_k |S(k) - T(k)|^p)^{1/p},$$

where S(k) and T(k) are the Fourier transform of s(j) and t(j), respectively, and $E_p$ is the error in an Lp-norm algorithm. The objective here is to minimize the error.

The Lp norm is a generalization of the more commonly used 2-norm. For a vector V the 2-norm is the square root of the sum of the squares of the elements of V. Alternatively 2-norm of a function f is the square root of the integral of the square of f. A 2-norm is more sensitive to changes in large values of V or f than to changes at small values. The Lp norm of a vector V for large values of p is approximately the maximum absolute value of the elements of V, and is almost independent of smaller elements. The 1-norm is the sum of the absolute values of V so is equally sensitive to all elements. The Lp norm for values of p less than one is more sensitive to changes in elements of V with small values than to changes in elements with large values.

Character recognition and barcode reading depend on detecting the presence or absence of features. Features whose presence is weakly detected or rejected usually cause an error in character recognition or in barcode reading. If a feature presence or absence is strongly detected, then a small change in that strength should not have much effect on the recognition process. Therefore, a least squares approach based on the 2-norm does not have ideal features for recognition. An Lp norm with p<1 has the required property of being more sensitive to weakly matched features and less sensitive to the strongly matched features.

The optimum value of p depends on the statistical distribution of images. The best way to determine the optimum value for p is to use a representative sample of images and experiment with a range of p to find the choice that produces the minimal number of errors.

The method of barcode reading, according to the present invention, locates the internal landmarks of the barcode symbol. Thus, it is not necessary to extrapolate or interpolate locations from the barcode target or barcode border-marking modules, which are typically used in existing one and two-dimensional barcode symbols. The method resolves the difficult problems of locating the barcode in the midst of other non-barcode graphics. With the barcode reading method, according to the present invention, it is possible to make use of a barcode without border markings or with a smaller target. This will result in increased information efficiency because either a smaller 2D barcode can be used or more information can be stored in the barcode symbol of a given size.

It should be noted that print growth distorts the locations of the common corners. For example, the common corners as located by template "0" or "7" will appear to be located below and to the right of the actual grid corner locations. Likewise, common corners as located by template "2" or "5" will appear to the left and above the actual locations. This mismatch of measured corner locations can be identified and adjusted with a single print growth parameter.

Each template "0" through "9" in FIG. 5*a* is independently correlated with the image of the barcode. The peaks of the correlation for each template are located approximately on a lattice depending on the type and size of barcode. Each set of peaks can be fit to a lattice. The location of lattice $T_n$ for template n is displaced by print growth. The lattice for template "0" or "7" will be displaced below and to the right of the lattice for template "2" or "3". Averaging the displacements for all the templates produces a best estimate for the actual lattice. Furthermore, the corner locations can also be distorted by noise and by the barcode printing and image scanning processes. These distortions can be corrected by fitting a smoothly distorted grid to the measured corner locations. The centers of the distorted grid are then used as calculated centers of the modules of the 2D barcode symbol. A weighted average of image pixels of the acquired image portion near these centers produce array densities. Applying a local (or global) threshold to these optical densities produces a best guess for the binary values of the barcode modules.

Identification of a lattice proceeds as follows. Shift the gray level so that black corresponds to a value −1 and white corresponds to a value +1. Correlate the image with templates T="0" through "9" from FIG. 5*a* to obtain weight distributions WT for each template at each location in the image. The correlation can be performed using an Lp-norm to improve recognition. Locate the local peaks in each of the WT and save the coordinates of the peaks. For example, the peaks for the weighted distribution of the image with template "4" are $P_4^j$ where j is an index for the peaks that are found. Each P is a two dimensional vector of the form (x, y).

Alternatively, the templates can be replaced with a set of functions $F_n(r,\theta)$ F(r)exp(inθ), where F(r) is the original template as depicted in FIG. 5*a*. F(r) has a peak near or less than half the module length. The advantages of this alternative method are that larger rotations of the barcode are automatically handled, and less correlation calculation is needed.

Construct a set of displacements $D_{T,T'}$ for each pair (T, T') by subtracting $P_T^j$ from $P_{T'}^{j'}$ where j and j' run over all peaks in T and T' respectively. The displacements, especially for relatively small distances will cluster around lattice points that are slightly shifted depending on print growth and noise. The center of mass $R^C_{T,T'}$ of each cluster is an estimate for a lattice point shifted by print growth. The diagonal centers of mass $R^C_{T,T}$ are independent of print growth and represent good estimates of the lattice points. The distances between the diagonal centers of mass and the off-diagonal centers of mass is a measure of print growth.

There are constraints based on the topology of the barcode that can help with parsing. For example, to the left of a peak corresponding to template "0" there must be one of "1", "7", or "9" some lattice spacing away. Therefore, $D_{0,0}$, $D_{0,2}$, $D_{0,3}$, $D_{0,4}$, $D_{0,5}$, $D_{0,6}$, and $D_{0,8}$, should not have any clusters a distance of 1 horizontal lattice spacing apart.

A distorted lattice is caused by problems in the printing or imaging processes. For example, if the surface containing the barcode is curved, then the lattice will be locally distorted. If that distortion is not too severe, then it can be handled by calculating the distance clusters locally. "Locally" can be defined in terms of a fixed distance, a fixed number of lattice steps, a fixed number of nearest peaks, or a weighted function that gives a higher weight to peaks in nearby parts of the image.

Once the locations of the corners of the lattice have been determined, the gray level is determined in the center of each lattice module by a weighted average of the gray level of pixels near the center of the module. Within a region of the image, the gray level will cluster into two groups corresponding to white and black modules. Again "locally" can be determined in terms of distance, lattice steps, or a fixed number of modules. A local threshold gray level is then determined that best separates the clusters of gray level. The local threshold can be improved further by compensating for print growth by setting the threshold darker for a module surrounded by black modules than for a module with more surrounding white modules.

FIG. 9 is a block diagram showing a system for reading a two-dimensional barcode system for reconstructing global geometry thereof. As shown, the system 400 comprises a data processing unit 420, which is operatively connected to an imaging device 410 to receive image data. The imaging device is not part of the invention. The imaging device can be a digital imager or a scanner, which is designed to capture the image of a barcode symbol 510 on a stationary or moving mailpiece 500. The data processing unit 420 has a software program 430 to reconstruct the local geometry of the two-dimensional barcode based on the received image data. The software program 420 is designed to carry out Fourier Transform at least a part of the acquired image pattern; to carry out template matching in the transform domain in order to locate common corners between the templates and the landmarks; and to reconstruct global geometry of the barcode symbol based on the distance between the common corners.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for reconstructing global geometry of a two-dimensional barcode susceptible to geometrical distortion, said barcode having a two-dimensional pattern composed of a plurality of contrasting polygons and comprising a plurality of common corners located at different locations within the two-dimensional pattern, each common corner defined by a group of said contrasting polygons located adjacent to each other, said method comprising the steps of:
   (a) acquiring an image of at least a part of the two-dimensional pattern;
   (b) comparing at least a portion of the acquired image with at least one template pattern for finding a match therebetween, each of said at least one template pattern comprising a group of contrasting sections located adjacent to each other defining at least one further common corner;
   (c) locating a number of common vertices within the two-dimensional pattern based on the further common corner;
   (d) obtaining a plurality of distances between the located common corner; and
   (e) determining linearity of at least a portion of the two-dimensional pattern based on the obtained distances in order to reconstruct global geometry of the barcode.

2. The method of claim 1, wherein the contrasting polygons are black and white.

3. The method of claim 1, wherein the contrasting polygons are rectangular and each common corner is defined by four adjacent contrasting polygons.

4. The method of claim 3, wherein each further common vertex is defined by four adjacent contrasting polygons.

5. The method of claim 1, wherein the template pattern is a pattern in a frequency domain, said method further comprising the step of:

transforming the portion of the acquired image into a transformed image in the frequency domain so as to carry out the comparing step in the frequency domain.

6. The method of claim 5, wherein the frequency domain has a plurality of frequencies in a frequency range, said comparing comprising the steps of:
   (a) obtaining a difference between the template pattern and the transformed image at said plurality of frequencies in the frequency domain,
   (b) summing the differences over the frequency domain for providing an error measurement, and
   (c) determining whether the match is found based on the error measurement.

7. The method of claim 6, wherein the difference at each of said plurality of frequencies is raised to a power of N prior to said summing, wherein N is a number greater than 0.

8. A data processing system for use in conjunction with an imaging device for recognizing a two-dimensional barcode on an item, said barcode having a two-dimensional pattern composed of a plurality of contrasting polygons and comprising a plurality of common corners located at different locations within the two-dimensional pattern, each common corner defined by a group of said contrasting polygons located adjacent to each other, the imaging device disposed relative to the item for acquiring at least a part of the two-dimensional pattern for providing data indicative of the acquired pattern, said two-dimensional barcode susceptible to geometrical distortion, said system comprising:
   (a) a data input device, operatively connected to the imaging device, for receiving data indicative of the acquired pattern;
   (b) a software program, responsive to the received data, for carrying out a plurality of data processing steps, which comprises:
   (c) comparing at least a portion of the acquired pattern with at least one template pattern for finding a match therebetween, each of said at least one template pattern comprising a group of contrasting sections located adjacent to each other defining at least one further common corner;
   (d) locating a number of common vertices within the two-dimensional pattern based on the further common corner;

(e) obtaining a plurality of distances between the located common corner; and (f) determining linearity of at least a portion of the two-dimensional pattern based on the obtained distances in order to reconstruct global geometry of the barcode.

9. The system of claim 8, wherein the template pattern is a pattern in a frequency domain, said data processing steps further comprise:

transforming the portion of the acquired image into a transformed image in the frequency domain so as to carry out the comparing step in the frequency domain.

10. The system of claim 9, wherein the frequency domain has a plurality of frequencies in a frequency range, said comparing comprising the steps of (a) obtaining a difference between the template pattern and the transformed image at said plurality of frequencies in the frequency domain, (b) summing the differences over the frequency domain for providing an error measurement, and (c) determining whether the match is found based on the error measurement.

* * * * *